United States Patent
Story (10) Patent No.: US 9,352,727 B2
(45) Date of Patent: May 31, 2016

(54) AUTOMATED TIRE INFLATION APPARATUS

(71) Applicant: Hennessy Industries, Inc., LaVergne, TN (US)

(72) Inventor: John Story, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 225 days.

(21) Appl. No.: 14/250,944

(22) Filed: Apr. 11, 2014

(65) Prior Publication Data

US 2014/0305538 A1 Oct. 16, 2014

Related U.S. Application Data

(60) Provisional application No. 61/811,518, filed on Apr. 12, 2013.

(51) Int. Cl.
*B60S 5/04* (2006.01)
*B60C 25/14* (2006.01)
*B60C 25/12* (2006.01)

(52) U.S. Cl.
CPC .............. *B60S 5/043* (2013.01); *B60C 25/12* (2013.01); *B60C 25/145* (2013.04); *B60C 25/147* (2013.04)

(58) Field of Classification Search
CPC ....... B60S 5/043; B60C 25/12; B60C 25/145; B60C 25/147
USPC ..................................... 141/38; 157/1.1, 1.11
See application file for complete search history.

(56) References Cited

U.S. PATENT DOCUMENTS

| | | | | |
|---|---|---|---|---|
| 3,461,938 A | * | 8/1969 | Mueller | B60C 25/132 157/1.1 |
| 4,183,392 A | * | 1/1980 | Kane | B60C 25/145 157/1.1 |
| 4,735,250 A | * | 4/1988 | Kane | B60C 25/145 157/1.1 |
| 5,015,505 A | * | 5/1991 | Cetnar | B05C 9/14 118/409 |
| 7,355,687 B2 | * | 4/2008 | Voeller | B60C 11/24 356/139.09 |
| 7,495,755 B2 | * | 2/2009 | Voeller | B60C 11/24 356/139.09 |
| 7,845,655 B2 | | 12/2010 | Lawson | |
| 8,176,960 B2 | | 5/2012 | Lawson | |
| 8,284,390 B1 | * | 10/2012 | Clasquin | B60C 25/0554 356/139.01 |
| 8,365,794 B2 | | 2/2013 | Lawson | |

(Continued)

OTHER PUBLICATIONS

Copyright 2000 Hennessy Industries and Coats, Coats® Inflation Station, 184241, Oct. 2000 rev. 0, two pages.

(Continued)

*Primary Examiner* — Nicolas A Arnett
(74) *Attorney, Agent, or Firm* — Patterson Intellectual Property Law, P.C.; Mark J. Patterson (57) ABSTRACT

An apparatus for inflating a tire including a base and a tire inflation line coupled with a pressure sensor. An air blast assembly includes a blast line fluidly coupled to a blast nozzle located on the base and configured to receive and direct pressurized gas from the blast line when the blast nozzle is in an air blast position relative to a tire and wheel assembly supported on the base. A device controller can monitor the pressure of a tire and wheel assembly and sense whether an effective tire bead seal has been formed. The device controller can generate a blast signal when no seal has been formed. A gas flow controller coupled to the air blast assembly and the device controller can be responsive to the blast signal to cause a blast of pressurized gas to be released from the blast nozzle to create an effective tire bead seal.

18 Claims, 6 Drawing Sheets

(56) References Cited

U.S. PATENT DOCUMENTS

| | | | |
|---|---|---|---|
| 8,537,347 B1* | 9/2013 | Clasquin | B60C 25/0554 356/139 |
| 2004/0165180 A1* | 8/2004 | Voeller | B60C 11/24 356/139.09 |
| 2008/0119962 A1* | 5/2008 | Voeller | B60C 11/24 700/279 |

OTHER PUBLICATIONS

Alibab.com, Bright Technology Co., Bright Tire Line, View Tire Line, Bright or OEM Product Details from Bright Technology, May 19, 2014, two pages.

All Tire Supply Company, Corghi Inflation Cage for Car Wheels (IC90), May 13, 2013.

* cited by examiner

AUTOMATED TIRE INFLATION APPARATUS

CROSS-REFERENCES TO RELATED APPLICATIONS

This application claims benefit of the following patent application(s) which is/are hereby incorporated by reference: U.S. Patent Application No. 61/811,518 for Automated Tire Inflation Device, filed Apr. 12, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to tire inflation devices and systems, and more particularly to tire inflation devices and systems that may be used in businesses that service motor vehicles and/or motor vehicle tires and wheels.

Conventionally, when a motor vehicle tire is repaired or replaced, the tire and wheel assembly is placed in a tire changing machine so that the old or damaged tire can be removed from the wheel. The new or repaired tire must then be remounted on the wheel and re-inflated to a desired pressure. The re-inflation steps may be performed when the tire and wheel assembly is on the tire changer or they may be performed using a standalone tire inflation apparatus.

During the re-inflation process, it is sometimes difficult to create an effective seal between the radial edge of the tire and the wheel, such that the tire cannot be properly inflated. To aid in forming an effective seal between the tire and wheel, an air blast process may be used. In this process, a blast of high pressure air is directed from an air blast nozzle toward the tire and wheel assembly to cause the tire edge or bead to move outwardly, thereby engaging and sealing against the wheel. Consequently, the tire can be properly inflated.

Thus, the present invention also pertains to a tire inflation apparatus that includes air blast functionality. In conventional tire inflation devices, the air blast process is manually controlled by an operator. First, the operator must determine visually or otherwise whether an effective seal has been created between the tire and wheel. If an effective seal is not present, the operator may position an air blast nozzle and/or move the tire and wheel assembly so that the nozzle is properly oriented to deliver an air blast to create the required sealing forces. Using a footswitch or other device, the operator manually activates a valve or other control mechanism to cause a high pressure air blast to be released from the nozzle. After the seal is created, the tire can be inflated to the desired pressure. When these steps are performed while the tire and wheel assembly are on a tire changer, the safety of the operator may be compromised in the event of an over-inflation accident. In tire changing operations where the re-inflation process is performed in a separate tire inflation apparatus, the operator may still be required to: (a) manually determine that a seal has not been formed; (b) manually control the movement of the nozzle and/or or tire into an air blast position; (c) manually activate the air blast mechanism; and (b) attempt to inflate the tire after a seal is formed. These manual processes are inefficient and require the operator to be present during the entire inflation process.

What is needed, then, is a tire inflation apparatus used in wheel service applications that provides enhanced safety and improved efficiency.

BRIEF SUMMARY OF THE INVENTION

The present invention generally relates to an apparatus for inflating tires including creating an effective tire bead seal on a tire and wheel assembly.

One aspect of the present invention is an apparatus for inflating a tire having a base configured to support a tire and wheel assembly. The apparatus includes a tire inflation line and a pressure sensor coupled to the tire inflation line. An air blast assembly includes a blast line fluidly connected to a blast nozzle. The blast nozzle is located on the base and is configured to receive pressurized gas from the blast line and to direct pressurized gas when the blast nozzle is in an air blast position relative to a tire and wheel assembly supported on the base. A device controller is functionally coupled to the pressure sensor. The device controller is configured to monitor the pressure of the tire to sense whether an effective seal has been formed between the tire and wheel supported on the base. The device controller generates an air blast control signal when an effective seal has not been formed. A gas flow controller is functionally coupled to the air blast assembly and to the device controller. The gas flow controller is responsive to the air blast control signal to cause an air blast to be released from the blast nozzle from the air blast position toward the tire and wheel assembly to create an effective tire bead seal.

In some embodiments, a wheel position assembly is also mounted on the base. The device controller is functionally coupled to the wheel position assembly. The device controller generates a wheel position control signal when an effective seal has not been formed between the tire and wheel during the inflation process. The wheel position assembly is responsive to the wheel position control signal to move the tire and wheel assembly to the air blast position relative to the blast nozzle before the air blast is released. In other embodiments, a blast nozzle movement assembly is mounted to the base and functionally coupled with the device controller. The device controller generates a blast nozzle position control signal when an effective seal between the tire and wheel is not present. The blast nozzle movement assembly is responsive to the blast nozzle position control signal to move the blast nozzle to the air blast position relative to the tire and wheel assembly supported on the base.

One object of the present invention is to provide an apparatus for inflating a tire on a tire and wheel assembly.

Another object of the present invention is to provide an apparatus that senses whether a proper tire bead seal has been formed in a tire and wheel assembly.

Another object of the present invention is to provide an apparatus that can release an air blast to form an effective seal in a tire and wheel assembly.

Another objective of the present invention is to provide a tire inflation apparatus that at least partially automates the inflation process.

DETAILED DESCRIPTION OF THE INVENTION

While the making and using of various embodiments of the present invention are discussed in detail below, it should be appreciated that the present invention provides many applicable inventive concepts that is embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The term "lateral" denotes a side to side direction when facing the "front" of an object.

Figure 1:
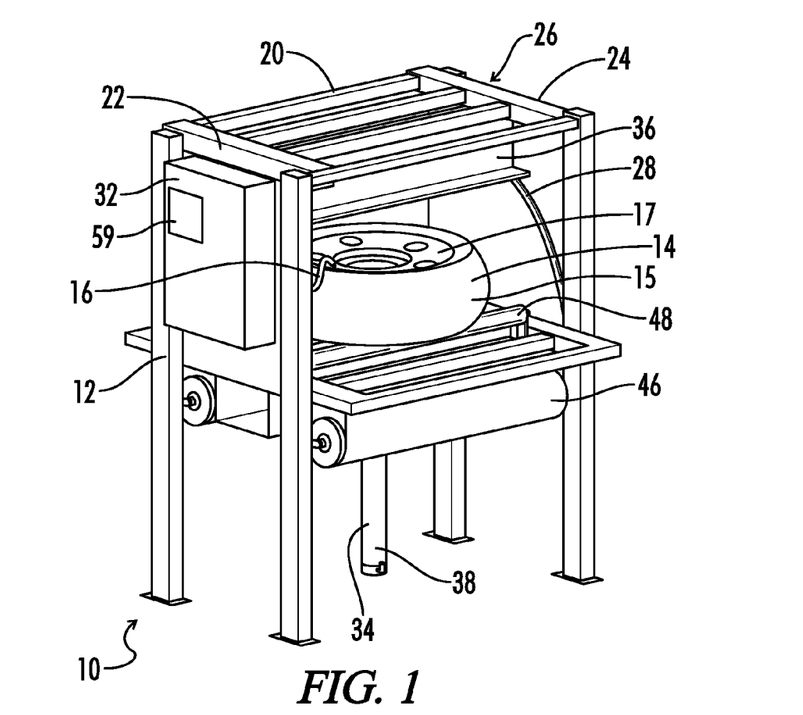
FIG. 1 is a side perspective view of one embodiment of a tire inflation apparatus according to the present invention.

One embodiment of an apparatus 10 for inflating a tire is shown in FIG. 1. The apparatus 10 includes a base 12 configured to hold a tire and wheel assembly 14. The base 12 may be a structure that supports a stand alone wheel inflation apparatus, as shown in FIG. 1. In other embodiments, the base and inflation apparatus may be integrated with a tire changing machine.

Figure 6:
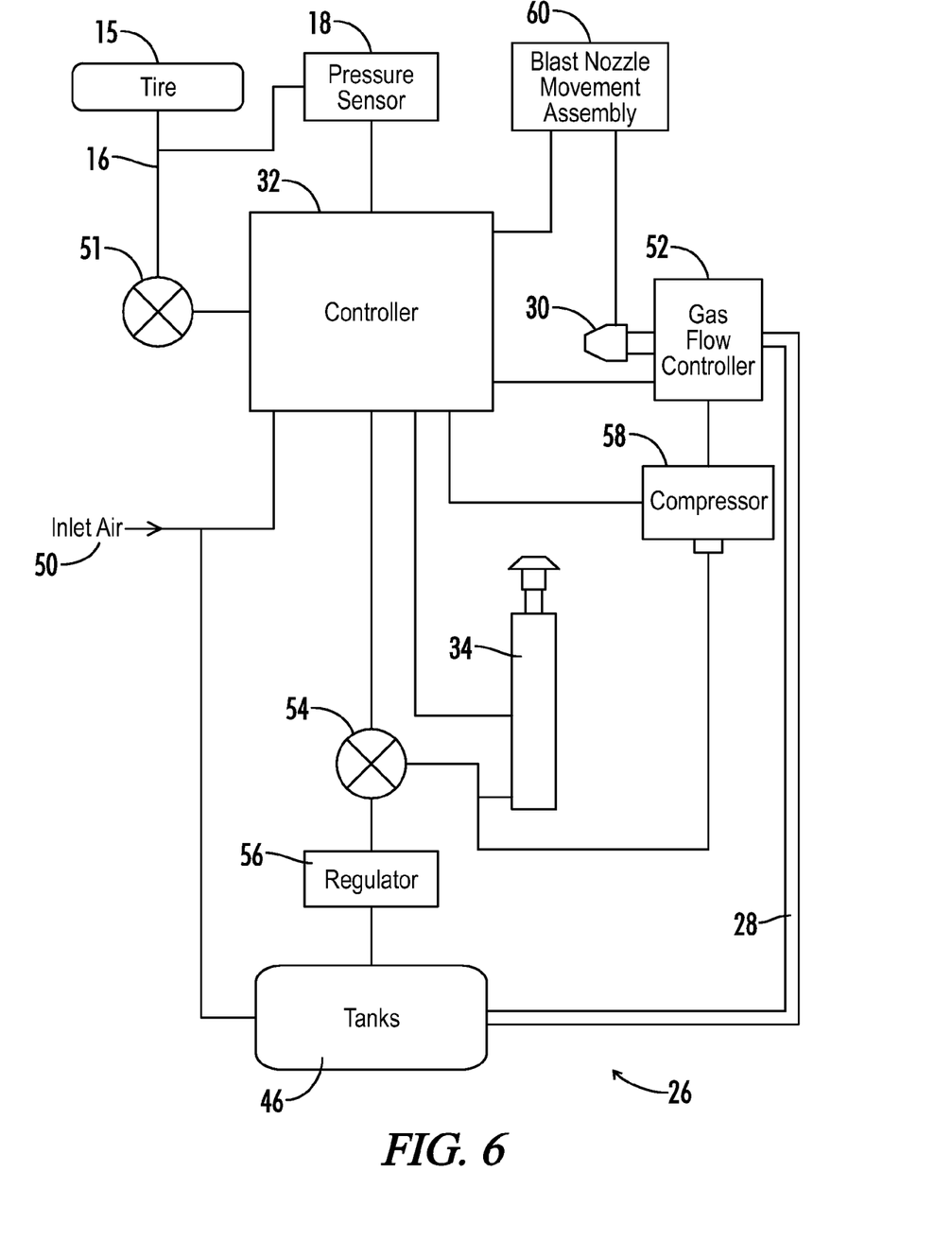
FIG. 6 is a schematic and block diagram of an embodiment of a pneumatic and electrical control circuit that can be used in the apparatus of FIG. 1.

The tire and wheel assembly 14 includes a pneumatic tire 15 mounted on a wheel 17. A tire inflation line 16 is coupled at an input end to a source of pressurized air and at an output end to a tire inflation valve on tire 15. In some embodiments, the source of pressurized air for inflating the tire can include an air inlet 50 and one or more air tanks 46, as shown in FIG. 6.

Figure 2:
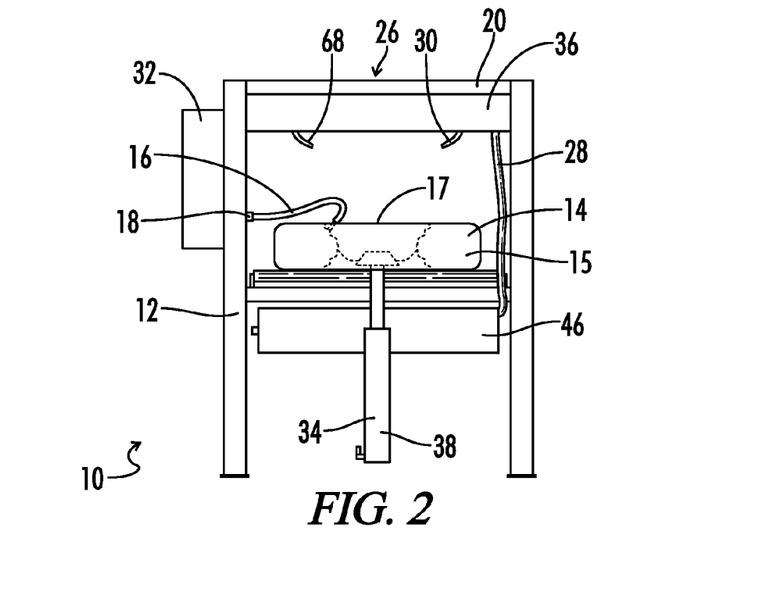
FIG. 2 is a side elevation view of the apparatus of FIG. 1 with the tire and wheel assembly in a lowered position on the base.

In some embodiments, the tire inflation line 16 can be a separate pneumatic hose that connects directly to the tire 15. In other embodiments, the tire inflation line 16 can be part of or attached to the base 12. The tire inflation line 16 can be coupled to a pressure sensor 18 as shown in FIG. 2. The pressure sensor 18 can sense the air pressure in the tire during the inflation process when the tire and wheel assembly is supported on the base 12.

Referring again to FIG. 1, the base 12 can include an upper cage section 20, a front panel 22, and a back panel 24. The upper cage section 20, front panel 22, and back panel 24 can be configured such that when a tire and wheel assembly 14 is supported on the base 12, the upper cage section 20, front panel 22, and back panel 24 partially enclose the tire and wheel assembly 14. As such, the upper cage section 20 and front and back panels 22 and 24 can form a safety barrier protecting an operator in the event of an over-inflation of a tire 15 supported on the base 12. In other embodiments, additional cage sections or panels can be added to provide further safety barriers.

To cause the tire 15 to inflate, an effective seal must be formed between the radial edge of the tire 15 and the wheel 17. Accordingly, an air blast assembly 26, shown in FIG. 1 and FIG. 2, can include an air blast line 28 which is fluidly coupled at an input end to a source of high pressure air and at an output end to an air blast nozzle 30. In some embodiments, the source of high pressure air can include inlet air 50, one or more air tanks 46, and a compressor 58 as shown on FIG. 6. The blast nozzle 30 can be located on the base 12 and configured to receive pressurized gas from the blast line 28. The blast nozzle 30 is positioned and oriented in an air blast position relative to the tire and wheel assembly 14.

The air blast position in some embodiments is not a fixed position but denotes a physical relationship between the blast nozzle 30 and the tire and wheel assembly 14. In the air blast position, the blast nozzle 30 can direct pressurized gas toward the tire and wheel assembly 14 to cause an effective seal to be formed between the tire 15 and wheel assembly 17. An effective seal exists between the tire 15 and wheel 17 when an air pressure can be maintained inside the tire 15 and the tire 15 can be inflated via the tire inflation line 16.

To create an effective seal in many tire and wheel assemblies, a tire pressure of 1 to 3 PSI must typically be achieved. The necessary parameters for creating this sealing pressure using an air blast process as described herein will vary depending on the configuration of the tire and wheel assembly, the blast air pressure and volume, nozzle outlet configuration, and the spatial and angular relationships between the nozzle outlet and the tire/wheel interface. In some embodiments, the nozzle outlet will be in close proximity to the interface between the tire and wheel, less than three inches, for example. The nozzle outlet can be oriented to direct the air blast at a blast angle of approximately 35 degrees with respect to the tire/wheel interface. The nozzle outlet in some embodiments can be bullet-shaped with a circular pattern of outlet ports defining an air outlet area of approximately 0.25 square inches. In other embodiments, the nozzle outlet can be rectangular in shape with an air outlet port defining an air outlet area of approximately 0.5 square inches. A volume of blast air of between 1300 cubic inches and 1650 cubic inches, at pressures between 150 PSI and 180 PSI, may typically be required to create an effective seal for tires ranging in size from 13 inches (P175/70R13) to 18 inches (P265/70R18). This air blast volume may also seal tire and wheel assemblies with larger diameter wheels because such assemblies typically they have smaller aspect ratios and tire volumes.

In some embodiments, when a tire and wheel assembly 14 is lifted onto and supported by the base 12, the blast nozzle 30 can be in a fixed position such that the tire and wheel assembly 14 and the blast nozzle 30 can readily be placed in the air blast position. In other embodiments, either the blast nozzle 30 or the tire and wheel assembly 14 can be re-positioned or moved to put the blast nozzle 30 and the tire and wheel assembly 14 in the air blast position. In additional embodiments, both the blast nozzle 30 and the tire and wheel assembly 14 can be moved to place the blast nozzle 30 and the tire and wheel assembly 14 in the air blast position. The ability to move the blast nozzle 30, the tire and wheel assembly 14, or both, can allow tires and wheels of different sizes and configurations to be placed on the apparatus 10 such that the nozzle 30 and the tire and wheel assembly 14 can be placed in a corresponding air blast position. Additionally, the blast nozzle 30 and/or the tire and wheel assembly 14 can be moved either before or after the air blasting process occurs such that the operator can have a larger workspace to handle the tire and wheel assembly 14.

The apparatus 10 can include a device controller 32. The device controller 32 can be functionally coupled to the pressure sensor 18. The device controller 32 may be a an analog controller, a microcontroller, a microprocessor, or other logic device that receives electrical and/or pneumatic inputs, processes the signals or other information from the inputs, and provides control signals or actuations to external components. Such controllers for electrical, mechanical, and pneumatic control are well known in the art. In an embodiment, the controller 32 is a microcontroller that can be programmed or otherwise configured to monitor a pressure of a tire 15 supported on the base via the pressure sensor 18. As the tire inflation line 16 supplies air to a tire 15, the pressure in the tire should increase if an effective seal is formed between the tire 15 and the wheel 17. If the pressure does not increase after the tire inflation line 16 has been activated, the device controller 32 can sense that an effective seal has not been formed. The device controller 32 can then generate an air blast control signal when an effective tire bead seal has not been formed.

A gas flow controller 52 regulates the flow of pressurized gas from the blast line 28 to the blast nozzle 30. In some embodiments, the gas flow controller 52 may be an electrically controlled valve that is fluidly connected to the air blast assembly 26 and electrically connected to the device controller 32. The gas flow controller 52 receives and responds to the air blast control signal to allow or cause a blast of pressurized gas to be released from the blast nozzle 30 toward the tire and wheel assembly 14 to create an effective tire bead seal. In embodiments where the tire and wheel assembly 14 and the blast nozzle 30 are in the air blast position when the tire and wheel assembly 14 is placed on and supported by the base 12, the air blast can occur immediately after the gas flow controller receives the air blast control signal, as the nozzle 30 and the tire and wheel assembly 14 are already in the blast position.

In other embodiments, as shown in FIG. 1 and FIG. 2, the apparatus 10 can further include a wheel position assembly 34. The wheel position assembly 34 can be mounted on the base 12 and functionally coupled to the device controller 32. The device controller 32 can be further programmed or otherwise configured to generate a wheel position control signal when the device controller 32 senses that an effective seal has not been formed between the tire 15 and wheel 17. The wheel position assembly 34 can be responsive to the wheel position control signal to move the tire and wheel assembly 14 vertically and/or horizontally on the base 12 to the air blast position relative to the blast nozzle 30 before the air blast is released.

As shown in FIG. 1 and FIG. 2, the base 12 may include an air blast assembly housing 36. The air blast assembly housing 36 can be located on the upper cage section 20 of the base 12. The blast nozzle 30 can be located on or in the air blast assembly housing 36. Additionally, the gas flow controller 52 coupled with the air blast assembly 26 can also be located in the air blast assembly housing 36. The blast line 28 can be run through the air blast assembly housing 36 such that it can be fluidly coupled to the blast nozzle 30. The tire and wheel assembly 14 can be placed on the base 12 so that it is situated generally below the blast nozzle 30. As such, the blast nozzle 30 can cause less interference as the operator places the tire and wheel assembly 14 on the base 12.

Figure 3:
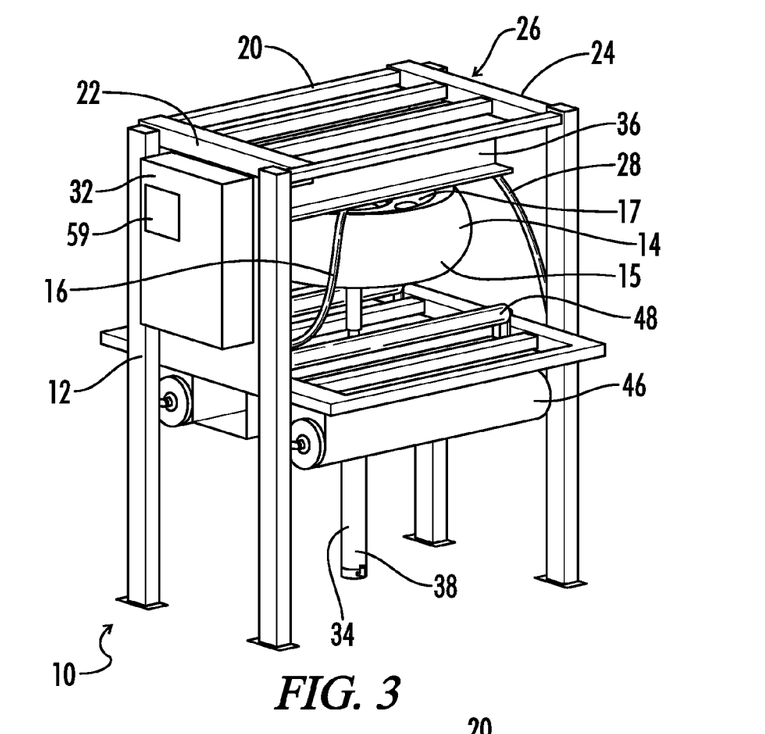
FIG. 3 is a side perspective view of the apparatus of FIG. 1 with the tire and wheel assembly in the air blast position relative to the blast nozzle.
Figure 4:
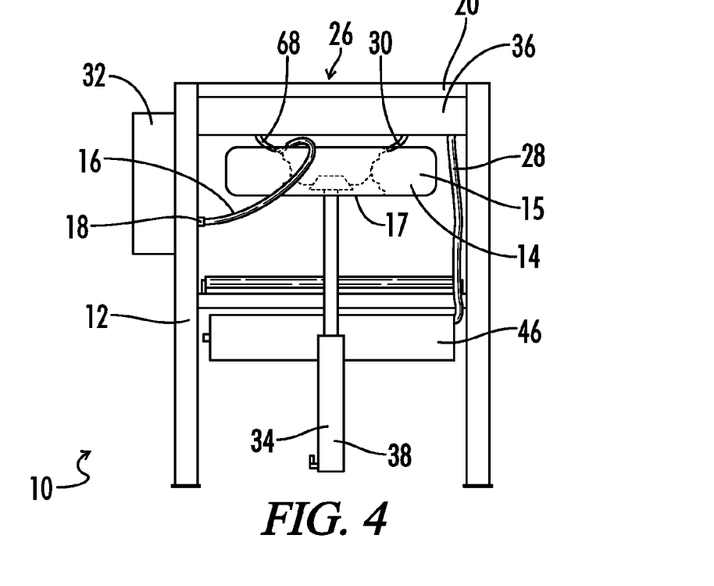
FIG. 4 is a side elevation view of the apparatus of FIG. 1 with the tire and wheel assembly in the air blast position relative to the blast nozzle.

The wheel position assembly 34 in some embodiments may include a lift member 38. When the device controller 32 senses that an effective seal has not been formed in the tire and wheel assembly 14, the lift member 38 can respond to the wheel position control signal by lifting the tire and wheel assembly 14 to a raised position, as shown in FIG. 3 and FIG. 4, such that the tire and wheel assembly 14 and the blast nozzle 30 are in the air blast position.

In some embodiments as shown, for example, in FIGS. 1 and 2, the lift member 38 may be a pneumatic cylinder which can be activated by the controller 32 to lift the tire and wheel assembly 14 toward the blast nozzle 30. In other embodiments, the lift member 38 can be any suitable mechanism for raising the tire and wheel assembly 14, including but not limited to a hydraulic lift or a mechanical motorized lift.

Figure 5:
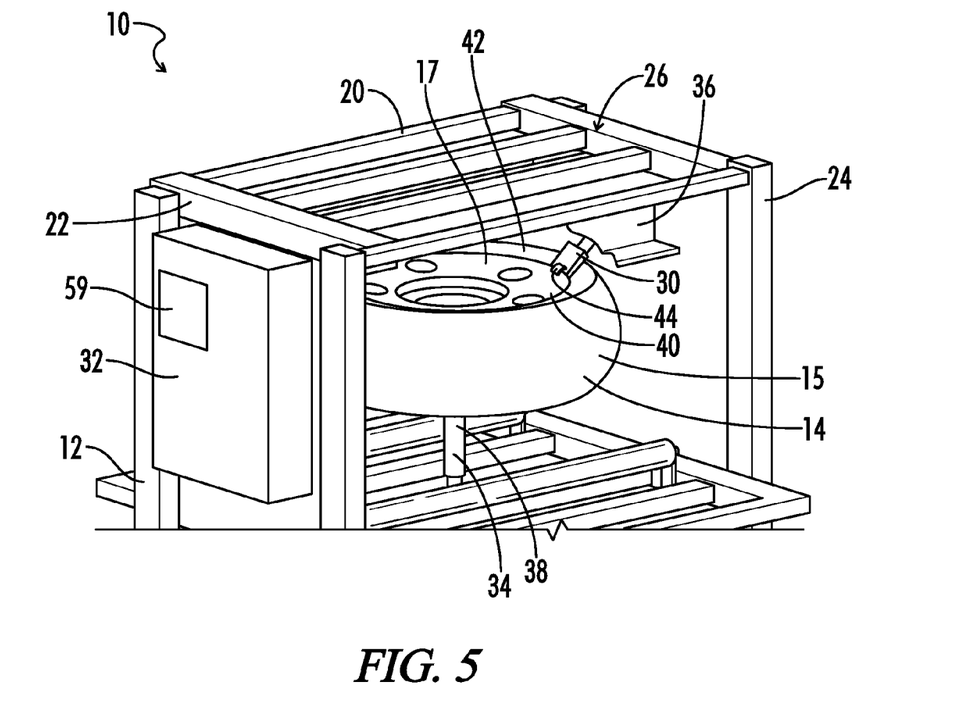
FIG. 5 is an enlarged detailed view of the apparatus of FIG. 1 showing the blast nozzle and the tire and wheel assembly in an air blast position relative to each other.

FIG. 5 shows a detailed view of the tire and wheel assembly 14 and the blast nozzle 30 in the air blast position. The blast nozzle 30 may be situated at a slightly radially outward position from the outer radial edge 40 of the wheel 17. As such, when an air blast is released from the blast nozzle 30, a large volume of high pressure gas is forced between the tire 15 and the wheel 17. This forces the bead of the tire 15 to move outward such that an effective tire bead seal can be formed between the tire 15 and the wheel 17. Other air blast positions may be used, depending on the size and configuration of the nozzle and/or tire and wheel assembly, and on the air pressure and volume parameters associated with air blast line.

In some embodiments, the blast nozzle 30 is positioned just above the tire 15 without making contact with the tire 15. In other embodiments, as shown in FIG. 5, a portion of the blast nozzle 30 may be substantially engaged with the surface 42 of the tire 15 such that the tire 15 is pushed downward on the wheel 17 to allow pressurized gas to more easily flow into the tire 15. In some embodiments, the blast nozzle 30 can be equipped with a hook 44 that can engage the outer radial edge 40 of the wheel 17 to ensure that the blast nozzle 30 and the tire and wheel assembly 14 are in the air blast position.

The blast nozzle 30 is shown extending out from the air blast assembly housing 26 such that a gap exists between the tire and wheel assembly 14 and the air blast assembly housing 26. Additionally, in some embodiments, the blast nozzle 30 can be recessed into a channel in the air blast assembly housing 36 such that the tire and wheel assembly 14 can contact the air blast assembly housing 36 when the tire and wheel assembly 14 is in the air blast position, as shown in FIG. 3. Having the tire and wheel assembly 14 in contact with the air blast assembly housing 26 can provide additional stability to the apparatus 10 and the tire and wheel assembly 14 during the blasting process.

Additionally, in some embodiments, the blast nozzle 30 can be configured to move laterally along air blast assembly housing 26 such that the blast nozzle 30 can be positioned along different points of the air blast assembly housing 26. As such, the device can accommodate tire and wheel assemblies 14 of different sizes and configurations as the blast nozzle 30. The position of the blast nozzle 30 can also be controlled by the device controller 32.

Referring again to FIG. 2, in some embodiments, the apparatus 10 can include one or more air tanks 46. The air tanks 46 can store a pressurized gas. The blast line 28 can then be coupled with the tank 46 such the blast line 28 can deliver pressurized gas from the tank 46 to the blast nozzle 30. In some embodiments, the tank 46 may be separated from the base 12. In other embodiments, the tank 46 is attached to or supported by the base 12.

Referring again to FIG. 1, in some embodiments the base 12 can include one or more rollers 48. As a tire and wheel assembly 14 is lifted on the base 12, the tire and wheel assembly 14 can be positioned on the rollers 48 such that the tire and wheel assembly 14 is easily movable on the base 12.

In some embodiments, the tire inflation line 16 is also functionally coupled to the device controller 32 either directly or via a valve or other controllable device. Once an air blast process has been performed, the device controller 32 can be configured to monitor a pressure of a tire 15 supported on the base 12 after an effective seal is formed between the tire 15 and the wheel 17. The device controller 32 can then generate a tire inflation control signal. The tire inflation line 16 or associated valve can be responsive to the tire inflation control signal to inflate the tire 15 to a desired pressure once an effective tire bead seal has been formed.

Thus, the entire inflation and blasting process may be partially or entirely automated using the apparatus 10. A tire and wheel assembly 14 can be placed on the base 12 by an operator. The operator can then set the desired pressure of the tire 15. The device controller 32 can include an operator interface or control panel 59 shown in FIG. 5 such that the user may input a desired pressure into the control panel 59 and set the device 10 to inflate the tire 15 to the desired pressure. With the tire inflation line 16 connected to the tire 15, the device controller 32 can monitor the pressure of the tire 15 via the pressure sensor 18 and sense whether an effective seal is formed. If an effective seal is formed, the tire inflation line 16 can supply air to the tire until the pressure reaches the desired pressure, and the tire inflation line 16 receives a tire inflation control signal from the device controller 32. If an effective seal has not been formed, then the controller can move the tire and wheel assembly 14 or blast nozzle 30 if necessary into the air blast position. An air blast control signal can be generated to release the air blast from the blast nozzle 30, thereby forming an effective seal on the tire and wheel assembly 14. The tire 15 can then be pressurized via the tire inflation line 16 to a desired pressure. As such, the operator can simply place a tire and wheel assembly 14 on the base 12, connect the tire inflation line 16, set the pressure, and walk away from the apparatus 10. The apparatus 10 will automatically perform the necessary functions to cause the tire 15 to be inflated to a desired pressure, without the operator having to manually determine whether an air blast is necessary, move the tire and wheel assembly 14 and blast nozzle 30 into an air blast position, actuate the blast, and inflate the tire. The operator is free to perform other tasks while the tire is inflating.

One embodiment of a pneumatic and electrical control circuit used by the apparatus 10 in FIG. 1 is shown in FIG. 6. An air supply or inlet air 50 can be connected to the tire and wheel assembly 14 via the tire inflation line 16. In some embodiments, the tire inflation line 16 can be functionally coupled to the device controller 32. A tire inflation valve 51 can be coupled with the tire inflation line 16 which can regulate the flow of air to the tire 15 in response to commands or control signals from the controller 32. The tire inflation valve 51 can also be electrically coupled to the device controller 32 such that the device controller 32 can alternate the tire inflation valve 51 between an open and closed position, thereby controlling the flow of air to the tire 15. As such, the device controller 32 can be functionally coupled to the tire inflation line 16 via the tire inflation valve 51.

A gas flow controller 52 can also be functionally coupled to the air blast assembly 26 and the device controller 32. The gas flow controller can be a valve that regulates the flow of pressurized gas to the blast nozzle 30. The device controller 32 can be electrically coupled to the gas flow controller 52 such that the device controller 32 can alternate the gas flow controller 52 between an open and closed position, thereby controlling the flow of gas to the blast nozzle 30. The gas flow controller 52 in some embodiments can be coupled to the blast line 28 as shown in FIG. 6. In other embodiments the gas flow controller 52 can be coupled with the blast nozzle 30. When the device controller 32 senses that an effective seal has not been formed between the tire 15 and the wheel 17, the device controller 32 can send an air blast signal which is received by the gas flow controller 52 causing the gas flow controller 52 to move to an open position and release pressurized gas in the blast line 28 through the blast nozzle 30. A seal can then be formed in the tire and wheel assembly 14.

The device controller 32 can also be functionally coupled to a wheel position assembly 34. The wheel position assembly 34 can be electrically connected to the device controller 32 such that the device controller 32 can control the operation of the wheel position assembly 34. When the tire and wheel assembly 14 is not initially in the air blast position and the device controller 32 senses that a proper seal has not been formed and an air blast is necessary, the device controller 32 can send a wheel position control signal to the wheel positioning assembly 34. The wheel position assembly 34 responding to the wheel position control signal, can move the tire and wheel assembly 14 into an air blast position relative to the blast nozzle 30.

In those embodiments having a wheel position assembly 34 that includes a pneumatic cylinder, the wheel position assembly 34 may also include a cylinder valve 54 which can be coupled with the inlet air 50 and opened to release air into the pneumatic cylinder thereby causing the pneumatic cylinder to move the tire and wheel assembly 14. The device controller 32 can also be electrically coupled to the cylinder valve 54 such that the device controller 32 can control the flow of air to the pneumatic cylinder 34.

In additional embodiments that include an air tank 46 which stores pressurized gas, the tank 46 can be coupled with the blast line 28. The tank can also be coupled with the air supply 50 and functionally coupled to the device controller 32, such that the device controller 32 can regulate an internal pressure of the pneumatic tank 46 via a regulator 56.

In some embodiments, the apparatus 10 can include an air compressor 58 in fluid communication with the blast line 28 and the blast nozzle 30. The air compressor 58 can be configured to further compress the pressurized air from the blast line 28 before the pressurized gas is received and then directed through the blast nozzle 30. The compressor 58 can increase the pressure of the gas associated with the air blast as well as the efficiency of the air blast release. The compressor can also be functionally coupled to the device controller 32 such that the device controller 32 can control the operation of the air compressor 58.

Figure 7:
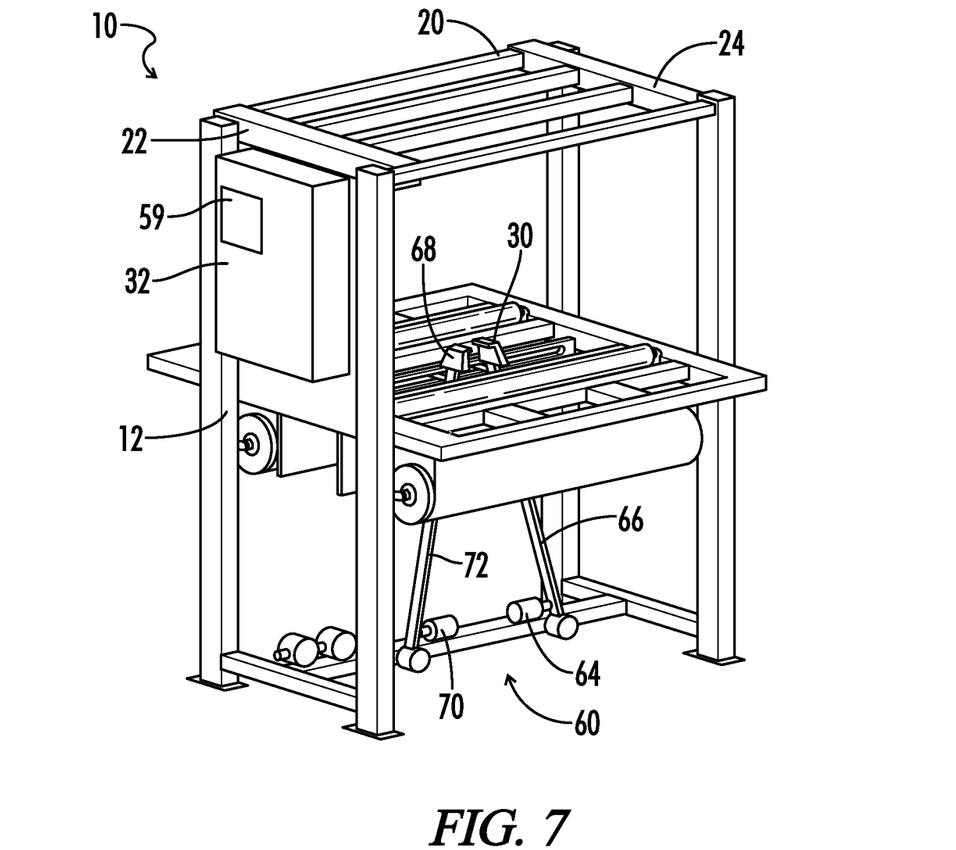
FIG. 7 is a top perspective view of another embodiment of a tire inflation apparatus according to the present invention.

A second embodiment of a tire inflation apparatus is shown in FIG. 7. The apparatus 10 in FIG. 7 further includes a blast nozzle movement assembly 60 mounted on the base 12. The blast nozzle movement assembly 60 can be functionally and electrically coupled with the device controller 32, as shown in FIG. 6. The device controller 32 can then be configured to generate a blast nozzle position control signal when the device controller 32 senses that an effective tire bead seal has not been formed on a tire and wheel assembly 14 supported on the base 12. The blast nozzle movement assembly 60 can be responsive to the blast nozzle position control signal to move the blast nozzle 30 to the air blast position relative to the tire and wheel assembly 14 before the air blast is released.

Figure 8:
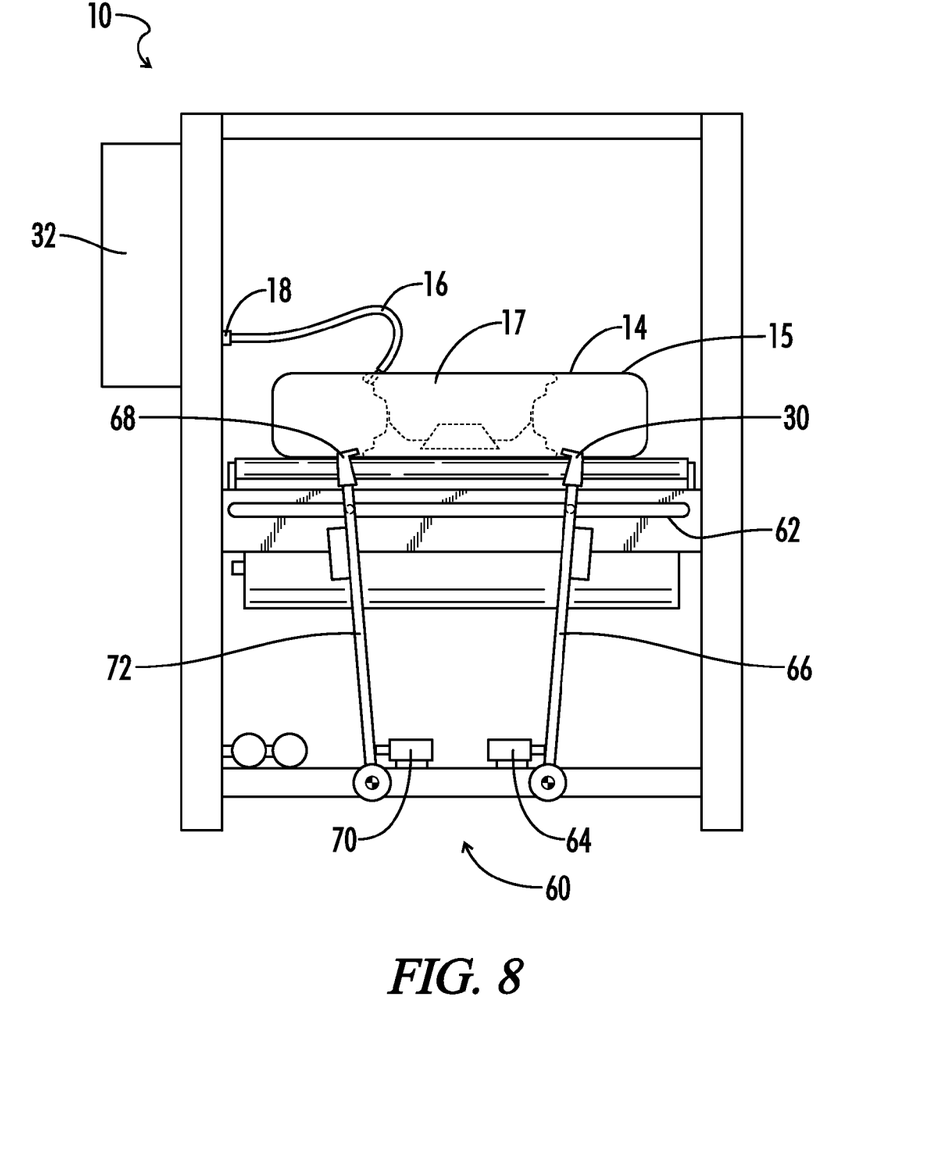
FIG. 8 is a side view of the apparatus of FIG. 7.

In some embodiments, as shown in FIG. 8, the blast nozzle movement assembly 60 can include guide rails 62 mounted on the base 12. The blast nozzle 30 can be attached to the guide rails 62. The blast nozzle movement assembly 60 can also include at least one linear actuator 64 mounted on the base 12. The linear actuator 64 can receive and respond to the blast nozzle position control signal generated by the device controller 32 to cause the blast nozzle 30 to move on the guide rails 62 to the air blast position relative to the tire and wheel assembly 14 supported on the base 12. In the embodiment shown in FIG. 8, a lever arm 66 is pivotally connected to the base 12 and is connected to the blast nozzle 30. The linear actuator 64 when activated pushes on the lever arm 66 which in turn moves the blast nozzle 30 on the guide rails 62 to the air blast position.

In the embodiment shown in FIG. 7 and FIG. 8. The blast nozzle 30 is positioned below the tire and wheel assembly 14. As such, the tire and wheel assembly would remain on the base 12 and would not have to be moved. The blast nozzle 30 can then be moved to place the blast nozzle 30 in the air blast position without having to lift the tire and wheel assembly 14.

In some embodiments, the apparatus 10 can include both a wheel position assembly and a blast nozzle movement assembly. For example, in FIG. 1, a blast nozzle movement assembly similar to the one shown in FIG. 8 can be included in the air blast assembly housing 26, such that the blast nozzle 30 can move along the air blast assembly housing 26 as previously described. As such, the device controller 32 can generate a wheel position control signal and a blast nozzle position control signal. The wheel positioning assembly can be responsive to the wheel position control signal to move the tire and wheel assembly 14 to the air blast position relative to the blast nozzle 30. Additionally, the blast nozzle movement assembly can be responsive to the blast nozzle position control signal to move the blast nozzle 30 to the air blast position relative to the tire and wheel assembly 14. As such, both the tire and wheel assembly 14 and the blast nozzle 30 can be moved by apparatus 10 into an air blast position before the air blast is released.

Additionally, in some embodiments, as shown in FIG. 2 and FIG. 7, the apparatus 10 can include a second blast nozzle 68 located on the base 12. The second blast nozzle 68 can be fluidly coupled to the blast line 28 and be configured to receive pressurized gas from the blast line 28 and to direct pressurized gas when the second blast nozzle 68 is in a second blast position relative to a tire and wheel assembly 14 supported on the base 12. When the device controller 32 senses that an effective seal has not been formed on a tire and wheel assembly 14 supported on the base 12, and the device controller 32 generates the air blast control signal, a second air blast of pressurized gas can be released through the second blast nozzle 68 when the gas flow controller responds to the air blast control signal to create an effective tire bead seal. As such, pressurized gas can be forced into a tire 15 from two positions which can help produce a more effective seal between the tire 15 and the wheel 17. In some embodiments, the two air blasts are directed at opposing sides of the tire and wheel assembly 14.

As shown in FIG. 8, the position of the second blast nozzle 68 can also be controlled by the blast nozzle movement assembly 10 when the device controller 32 generates a blast nozzle position control signal. In embodiments that include guide rails 62 mounted on the base 12, the second blast nozzle 68 can be located on the guide rails 62. The blast nozzle movement assembly 60 can also include a second linear actuator 70 mounted on the base. The second linear actuator 70 responds to the blast nozzle position control signal to move the second blast nozzle 68 on the guide rails 62 to a second air blast position relative to the tire and wheel assembly 14. In some embodiments, the blast nozzle movement assembly 60 can include a second lever arm 72 pivotally connected to the base 12 and connected to the second blast nozzle 68. When the second linear actuator 70 receives the blast nozzle position control signal, the second linear actuator 70 pushes against the second lever arm 72, thereby moving the second blast nozzle 68 on the guide rails 20 to the second air blast position.

Another aspect of the present invention is a method of controlling the inflation of a tire using an apparatus similar to any of the devices 10 previously described. The method includes the steps of providing a base configured to support a tire and wheel assembly, and a tire inflation line. The tire inflation line can be coupled to a pressure sensor. The base can include an air blast assembly located on the base. The air blast assembly can include a blast line fluidly coupled to a blast nozzle located on the base, the blast nozzle configured to receive pressurized gas from the blast line and to direct pressurized gas when the blast nozzle is in an air blast position relative to a tie and wheel assembly supported on the base as previously described. The method includes providing a device controller functionally coupled to the pressure sensor. The pressure of a tire can be monitored with the device controller to sense whether an effective tire bead has been formed in a tire and wheel assembly supported on the base. The method includes positioning a tire and wheel assembly supported on the base and the blast nozzle in the air blast position when an effective tire bead seal has not been formed. An air blast control signal is generated in the device controller when an effective tire bead seal has not been formed. The air blast control signal is received in a gas flow controller fluidly coupled to the air blast assembly to cause an air blast of pressurized gas to be released from the blast nozzle from the air blast position toward the tire and wheel assembly to create an effective tire bead seal.

In some embodiments of the method, the tire inflation line is functionally coupled to the device controller and the method further includes the step of generating a tire inflation control signal in the device controller after an effective tire bead seal is formed, the tire inflation line receiving the tire inflation control signal to cause the tire to be pressurized to a desired pressure.

In other embodiments of the method, the positioning step of the tire and wheel assembly and blast nozzle in the air blast position further includes providing a wheel position assembly mounted on the base, the wheel position assembly functionally coupled to the device controller. The device controller can generate a wheel position control signal which is received by the wheel position assembly to move the tire and wheel assembly supported on the base to the air blast position relative to the blast nozzle. In other embodiments, the step of positioning the tire and wheel assembly and the blast nozzle in the air blast position further includes providing a blast nozzle movement assembly which is mounted on the base and functionally coupled to the device controller. The device controller can generate a blast nozzle position control signal which is received by the blast nozzle movement assembly to move the blast nozzle to the air blast position relative to a tire and wheel assembly located on the base.

In some embodiments, the base can include one or more rollers, and the positioning step of the tire and wheel assembly and the blast nozzle in the air blast position includes placing the tire and wheel assembly on the rollers and moving the tire and wheel assembly on the base. In other embodiments, the base may include a upper cage section, a front panel, and a back panel, and the positioning step of the tire and wheel assembly and the blast nozzle in an air blast position includes positioning the tire and wheel assembly on the base such that the upper cage section, front panel, and back panel partially surround the tire and wheel assembly to act as a safety barrier in the event of a blowout.

Thus, although there have been described particular embodiments of the present invention of a new and useful AUTOMATED TIRE INFLATION APPARATUS, it is not intended that such references be construed as limitations upon the scope of this invention except as set forth in the following claims.

What is claimed is:

1. An apparatus for inflating a tire comprising:
   a base configured to support a tire and wheel assembly;
   a tire inflation line;
   a pressure sensor coupled to the tire inflation line;
   an air blast assembly comprising a blast line fluidly coupled to a blast nozzle, wherein the blast nozzle is located on the base and configured to receive pressurized gas from the blast line and to direct pressurized gas when the blast nozzle is in an air blast position relative to a tire and wheel assembly supported on the base;
   a device controller functionally coupled to the pressure sensor, the device controller configured to
      monitor a pressure of a tire to sense whether an effective tire bead seal has been formed in a tire and wheel assembly supported on the base, and
      generate an air blast control signal when an effective tire bead seal has not been formed in a tire and wheel assembly supported on the base; and
   a gas flow controller functionally coupled to the air blast assembly and to the device controller, wherein the gas flow controller is responsive to the air blast control signal to cause an air blast of pressurized gas to be released from the blast nozzle from the air blast position toward the tire and wheel assembly to create an effective tire bead seal.

2. The apparatus of claim 1, further comprising a wheel position assembly mounted on the base and functionally coupled to the device controller, and wherein
   the device controller is further configured to generate a wheel position control signal when an effective tire bead seal has not been formed in a tire and wheel assembly supported on the base, and
   the wheel position assembly is responsive to the wheel position control signal to move a tire and wheel assembly supported on the base to the air blast position relative to the blast nozzle before the air blast is released.

3. The apparatus of claim 2, wherein:
   the base comprises an upper cage section, and the blast nozzle is located on the upper cage section; and
   the wheel position assembly comprises a lift member, the lift member is responsive to the wheel position control signal to move the tire and wheel assembly vertically to the air blast position relative to the blast nozzle before the air blast is released.

4. The device of claim 3, wherein the lift member comprises a pneumatic cylinder.

5. The apparatus of claim 1, further comprising a blast nozzle movement assembly mounted on the base and functionally coupled to the device controller, and wherein
   the device controller is further configured to generate a blast nozzle position control signal when an effective tire bead seal has not been formed in a tire and wheel assembly supported on the base, and
   the blast nozzle movement assembly is responsive to the blast nozzle position control signal to move the blast nozzle to the air blast position relative to the tire and wheel assembly before the air blast is released.

6. The apparatus of claim 5, wherein the blast nozzle movement assembly comprises guide rails and at least one linear actuator mounted on the base, the blast nozzle located on the guide rails, and the linear actuator is responsive to the blast nozzle position control signal to move the blast nozzle on the guide rails to the air blast position relative to a tire and wheel assembly supported on the base before the air blast is released.

7. The apparatus of claim 1, further comprising a wheel position assembly and a blast nozzle movement assembly mounted on the base, the wheel position movement assembly and the blast nozzle movement assembly functionally coupled to the device controller, and wherein
   the device controller is further configured to generate a wheel position control signal and a blast nozzle position control signal when an effective tire bead seal has not been formed in a tire and wheel supported on the base, and
   the wheel position assembly is responsive to the wheel position control signal to move a tire and wheel assembly supported on the base to the air blast position relative to the blast nozzle and the blast nozzle movement assembly is responsive to the blast nozzle position control signal to move the blast nozzle to the air blast position relative to a tire and wheel assembly supported on the base before the air blast is released.

8. The apparatus of claim 1, wherein the base further comprises a upper cage section and front and back panels, the upper cage section and front and back panels positioned to partially surround a tire and wheel assembly supported on the base.

9. The apparatus of claim 1, further comprising a pneumatic tank fluidly coupled to the air blast line.

10. The apparatus of claim 9, wherein the pneumatic tank is attached to the base.

11. The apparatus of claim 1, further comprising an air compressor in fluid communication with the blast nozzle.

12. The apparatus of claim 1, wherein the device controller is functionally coupled to the tire inflation line, and wherein
   the device controller is configured to monitor an inflation pressure in a tire and wheel assembly supported on the base and generate a tire inflation control signal after an effective tire bead seal has been formed between a tire and wheel assembly, and
   the tire inflation line is responsive to the tire inflation control signal to pressurize a tire to a desired pressure.

13. The apparatus of claim 1, wherein the base further comprises one or more rollers configured for supporting and allowing horizontal movement of a tire and wheel assembly supported on the base.

14. The apparatus of claim 1, wherein
   the air blast assembly further comprises a second blast nozzle located on the base, the second blast nozzle fluidly coupled to the blast line and configured to receive pressurized gas from the blast line and to direct pressurized gas when the second blast nozzle is in a second air blast position relative to a tire and wheel assembly supported on the base.

15. A method of controlling the inflation of a tire using a tire inflation apparatus, the tire inflation apparatus including a device controller and an air blast nozzle coupled to a source of pressurized gas, the method comprising the steps of:
   directing gas into the tire via a tire inflation line;
   using a pressure monitor coupled to the device controller, automatically monitoring the pressure of the tire to sense whether an effective tire bead seal has been formed in a tire and wheel assembly;
   generating an air blast control signal from the device controller when an effective tire bead seal has not been formed; and
   in response to the air blast control signal, automatically releasing an air blast of pressurized gas toward the tire and wheel assembly to create an effective tire bead seal.

16. The method of claim 15, wherein the tire inflation line is functionally coupled to the device controller, and the method further comprises generating a tire inflation control signal in the controller after an effective tire bead seal is formed, the tire inflation line receiving the tire inflation control signal to cause the tire to be pressurized to a desired pressure.

17. The method of claim 15, wherein the tire inflation apparatus further includes a wheel position assembly functionally coupled to the device controller, the method further comprising
   outputting a wheel position control signal from the device controller when an effective tire bead seal has not been formed,
   receiving the wheel position control signal in the wheel position assembly,
   in response to receiving wheel position control signal, moving the tire and wheel assembly supported on the base to the air blast position relative to the blast nozzle.

18. The method of claim 15, wherein the tire inflation apparatus further includes a blast nozzle movement assembly, and the method further comprises
   outputting a nozzle position control signal from the device controller when an effective tire bead seal has not been formed,
   receiving the nozzle position control signal in the blast nozzle position assembly,
   in response to receiving nozzle position control signal, moving the blast nozzle to the air blast position relative to the blast nozzle.

* * * * *